May 12, 1953     J. G. HORN     2,638,117
CONTROL SYSTEM HAVING A MANUAL TRANSFER VALVE
Filed Sept. 11, 1947     2 Sheets-Sheet 1
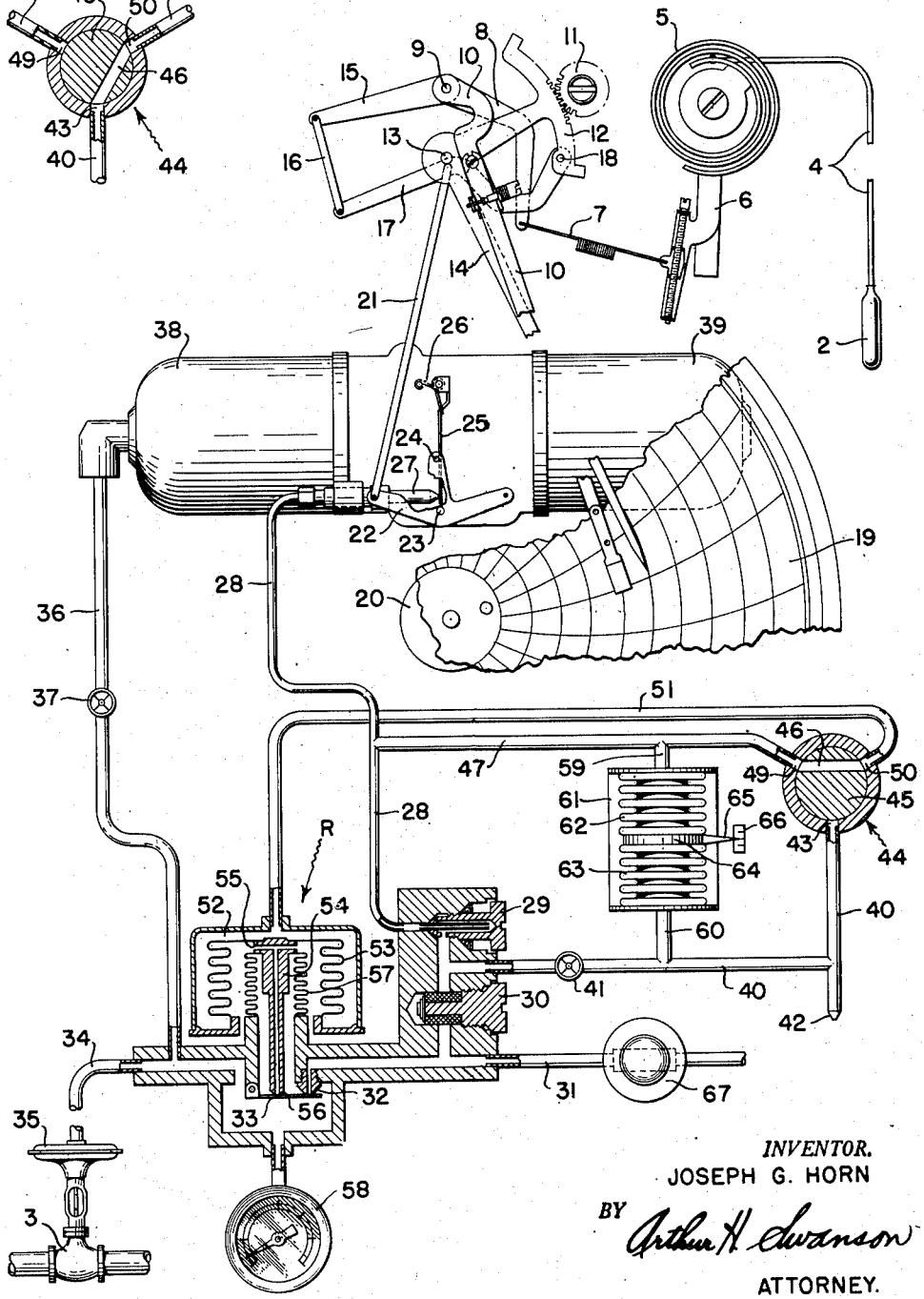
INVENTOR.
JOSEPH G. HORN
BY *Arthur H. Swanson*
ATTORNEY.

May 12, 1953 J. G. HORN 2,638,117
CONTROL SYSTEM HAVING A MANUAL TRANSFER VALVE
Filed Sept. 11, 1947 2 Sheets-Sheet 2
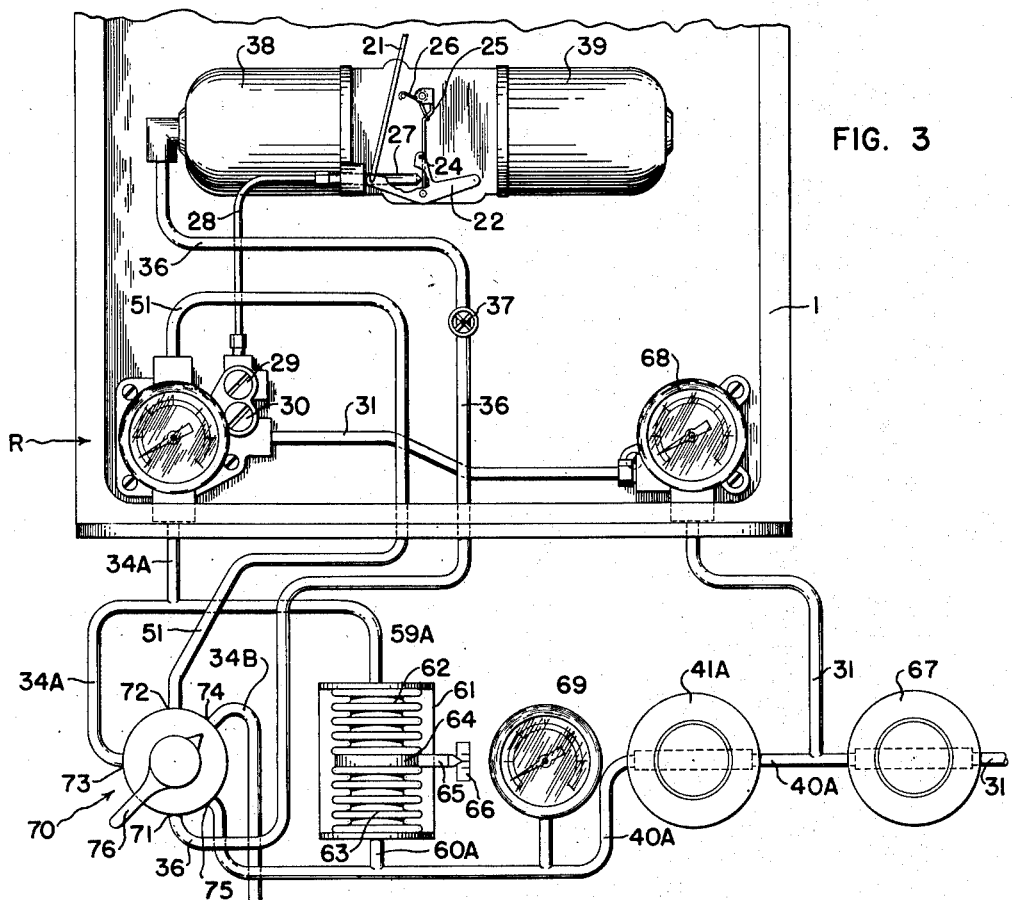
FIG. 3
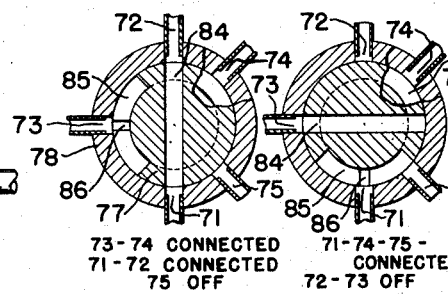
FIG. 4 AUTOMATIC
73-74 CONNECTED
71-72 CONNECTED
75 OFF
FIG. 5 MANUAL
71-74-75- CONNECTED
72-73 OFF
FIG. 6 CHECK
71-72 CONNECTED
74-75 CONNECTED
73 OFF
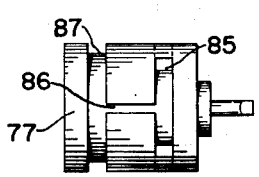
FIG. 7
INVENTOR.
JOSEPH G. HORN
BY Arthur H. Swanson
ATTORNEY

Patented May 12, 1953

2,638,117

UNITED STATES PATENT OFFICE

2,638,117

CONTROL SYSTEM HAVING A MANUAL TRANSFER VALVE

Joseph G. Horn, Drexel Hill, Pa., assignor, by mesne assignments, to Minneapolis-Honeywell Regulator Company, Minneapolis, Minn., a corporation of Delaware Application September 11, 1947, Serial No. 773,485

5 Claims. (Cl. 137—557)

The present invention relates to apparatus and methods concerning measuring and controlling instruments of the fluid operated type which are selectively adjustable for effecting either manual or automatic regulation of the flow of a controlling medium to a variable condition. It is a general object of the invention to provide methods and to incorporate in such an instrument simple and efficient means for facilitating the adjustment of the instrument from its automatic to its manual regulating condition of adjustment and vice versa.

One specific object of this invention is to provide for manual operation of the apparatus by means of a by-pass having a manually operable pressure regulator and a bleed orifice.

Another object of this invention is to provide a manually controlled by-pass for a pneumatically-operated control instrument, which by-pass is applicable to standard pneumatic controllers of a well-known and widely used commercial type.

Yet another object of this invention is to provide an air-operated control instrument composed of a minimum number of simple, readily available, component parts.

Still another object of this invention is to provide improved air control apparatus employing a relay valve in which the relay valve is used as an operating or controlling element both when the apparatus is operated automatically and when it is operated manually.

In automatically operable control systems it is desirable, and in some cases necessary, to make some provisions for effecting manual control of the condition or action. The manual control mechanism may be used when the condition or system under control is first placed into operation and while the variables being regulated are brought to a desired normal value. It is also beneficial to use the manual control mechanism when an upset occurs in the system or condition or any one or more of several related variables are being changed. Accordingly, it is desirable to provide mechanism by means of which manual as well as automatic control may be effected.

When starting the condition or system should not be placed under the control of the automatically operable control until this automatically operable control is conditioned or positioned properly to maintain the condition or system at a desired location or value. This operation will be explained using as an example, a control system supplying automatically regulated or manually regulated air pressure to the air pressure operated motor which shifts a control valve supplying fuel to a furnace containing a thermometer which varies the automatically regulated air pressure. In such a control system, an air pressure gauge is connected to the automatically regulated air pressure and another air pressure gauge is connected to the manually regulated air pressure. It is necessary for the operator to continually shift his glance from one gauge to the other and to wait until the temperature of the furnace has reached the value at which it is desired to maintain the furnace automatically and until the automatically regulated air pressure necessary to maintain this temperature is indicated on the air pressure gauge connected to it. This occurs when the value indicated by the air pressure gauge indicating the automatically variable air pressure is equal to or at some predetermined ratio to the value of the air pressure indicated by the gauge connected to the manually variable air pressure. At this time, when the two air pressures are in some selected relationship (usually equal), the shift or transfer can be made from the manual to the automatic control.

This invention has the advantage that but a single gauge need be employed. This gauge is differential air pressure operated being responsive to both the automatically and to the manually regulated air pressure. This gauge indicates at one easily seen place whether or not these air pressures are equal or balanced. The operator's attention is not diverted, distracted or divided. He can readily effect the shift or transfer of the manually regulated air pressure to the air pressure automatically regulated by the thermometer.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Of the drawings:

Fig. 1 is a schematic or diagrammatic view, principally in front elevation with parts broken away in vertical cross section, showing one modification of the device in position for automatic operation;

Fig. 2 is a view in vertical, transverse cross section through the transfer valve showing it in position for manual operation;

Fig. 3 is a schematic or diagrammatic view, in front elevation;

Figs. 4, 5 and 6 are views in vertical, transverse cross section through the transfer valve of a modified form showing it in various positions; and Fig. 7 is a side elevation of the plug or movable member of the transfer valve.

In Figs. 1 and 2 of the drawings there is illustrated, by way of example, one embodiment of this invention. This embodiment of the invention comprises a fluid controlled instrument having an enclosing case (not shown). An element is provided to respond to the temperature, pressure, flow, liquid level, specific gravity, or any one of a number of variables to which it is desired to have the controlled device respond. This element may be located so as to respond to some independent condition or so as to respond to a variable controlling the operation of the controlled device, as for example, the temperature of a furnace heated by fuel the flow of which is regulated by the control valve 3. One example of such an element is the fluid or vapor filled bulb 2, connected by a means of capillary piping 4 to a spiral or Bourdon tube 5 one end of which is fast to the casing and whose opposite end is free to move. The free end of spiral or Bourdon tube 5 rocks or rotates a lever 6 connected by means of a flexible or spring link 7 to an arm 8 carried by a pen shaft 9 which is journalled in the instrument casing. The pen shaft 9 carries a pen arm 10, which is shown broken away intermediate its length in Fig. 1. A set point indicator comprises a manually operable gear 11 rotatably mounted in the instrument casing in such manner as to mesh with the teeth of a sector 12 pivotally mounted on shaft 13 and connected to an elongated index 14, which is also shown in Fig. 1 as broken away intermediate its ends.

The pen shaft 9 also carries a control arm 15, the free end of which is connected by a link 16 to one end of a lever 17. The other end of lever 17 is connected to a fulcrum pivot 18. Pivot 18 is normally stationary, but is subject to adjustment in position by set point adjusting means, which may be of known type and need not be shown or described herein. A record of the varying values of the controlled condition affecting bulb 2 is made by the pen arm 10 on a record chart 19 rotated by a chart driving shaft 20. Index 14 is angularly adjusted as the fulcrum pivot 18 is adjusted in position to indicate and set by reference to record chart 19, the value of the controlling condition which the instrument tends to maintain by its adjustment of valve 3 to which the instrument transmits a controlling fluid pressure.

Intermediate its ends, lever 17 is pivoted to the upper end of link 21. The lower end of link 21 is pivoted to a lever 22 (shown partially broken away in Fig. 1) having a movable fulcrum pivot 23. The lever 22 is angularly adjusted about the fulcrum pivot 23 by longitudinal adjustment of the lever 21 and is also alternatively adjusted by lateral adjustment of the fulcrum pivot 23. The lever 22 carries a pin 24 which causes a flapper valve 25 to move against the stress of its biasing spring 26 toward and away from a bleed nozzle 27 as the lever 22 is adjusted. The bleed nozzle 27 is connected by a pipe 28, which supplies air under suitable pressure to the instrument, to a restrictive orifice 29 and a filter 30 to inlet pipe 31. The adjustment of the flapper valve 25 toward and away from the end of the nozzle 27 increases and decreases the fluid pressure at the outlet side of the restrictive orifice 29. Fluid under suitable pressure from inlet pipe 31 is transmitted to inlet nozzle 32 of a pressure controlled relay valve R, which nozzle is controlled by a flapper valve 33. Relay valve R maintains an output pressure in accordance with the position of a flapper valve 33 with respect to the nozzle 32. The output of relay R is connected by means of a pipe 34, to a fluid pressure operated motor 35, of diaphragm or other type, for operating the control valve 3. An additional portion of the outlet fluid of the relay valve R is conducted by means of a pipe 36, controlled by a stop cock 37, to a follow up element 38 having an associated reset or compensating element 39.

An additional portion of the fluid from the inlet pipe 31 is conducted, through filter 30, to a by-pass conduit 40 containing a manually operated needle valve 41 and a restrictive bleed orifice 42 for the escape of fluid pressure to exhaust or atmosphere. The opposite end of by-pass pipe 40 is connected to one inlet port 43 of a transfer valve, generally indicated at 44, having a manually operable valve plug 45 movably mounted in it. Valve plug 45 contains a passageway 46 in it. A pipe 47 extends from the pipe 28 leading to the nozzle 27 to a second inlet port 49 of the valve 44. Valve 44 also has an outlet port 50 communicating with one end of a pipe 51 whose opposite end communicates with the bellows chamber 52 of the relay valve R. Bellows chamber 52 contains a bellows 53 which is exposed at its opposite side to the atmosphere. Movement of bellows 53 moves a valve stem 54 having a perforation 55 through it. Perforation 55 communicates at one end with the atmosphere and at the opposite end with a nozzle 56 controlled by the flapper valve 33. An inner bellows 57 also contacts the valve stem 54 and is exposed on its outer side to the atmosphere and on its inner side to the pressure existing in the pipes 34 and 36. A gauge 58 is also connected to the output side of the relay valve R to indicate its output pressure.

In accordance with the present invention, a differential pressure indicator is connected, by means of a pipe 59, with the pipe 47, and by means of a pipe 60 with the by-pass pipe 40. This differential pressure indicator comprises a casing 61 enclosing an upper bellows 62 and a separate lower bellows 63 which alternatively may have their movements of expansion and contraction along the same axis or parallel axes and which have an inherent bias or spring tension toward an intermediate position. Connected to bellows 62 and to bellows 63 is an indicator 64 having a pointer 65 movable so as to pass and cooperate with a stationary scale 66.

The operation of the device of this invention is as follows. It may be started under the manual control of needle valve 41. Fluid (regulated by a suitable pressure regulator 67 to a suitable pressure, say 17 pounds per square inch) is supplied through the inlet conduit 31 and the filter 30 to the by-pass pipe 40. If the transfer valve 44 is set in the position shown in Fig. 2 so that the passageway 46 connects the ports 43 and 50, the fluid is conducted through the valve 44 and the pipe 51 to the bellows chamber 52. In such case, needle valve 41 can be manually adjusted to control the operation of bellows 53 and cause movement of flapper valve 33 to open port 32 and supply fluid through pipe 34 to the fluid pressure operated motor 35 which operates valve 3. At the same time fluid passes through restrictive orifice 29, and pipe 28, to nozzle 27. The pressure of this fluid is controlled by means of flapper valve 25 in response to the condition affecting bulb 2. By means of pipes 47 and 59, the fluid pressure controlled by flapper valve 25 is applied to bellows 62. By means of pipe 60, the manually controlled fluid pressure is applied to bellows 63. Pointer 65 indicates, by reference to scale 66, whether or not the pressures within the bellows 62 and 63 are equal or within a range to which the bellows are preliminarily set and which indicates a differential pressure. If these pressures are not equal the transfer valve 44 should not be manipulated by the operator to place the valve 3 under the automatic control of the instrument until the condition affecting the bulb 2 has brought the automatically controlled pressure in pipe 28 and consequently in bellows 62 to equal the manually controlled pressure in bellows 63. When these pressures are equal the transfer valve 44 may be turned from the position in which it is shown in Fig. 2 to the position in which it is shown in Fig. 1 so that the bellows 53 is under the control of the pressure controlled by the flapper valve 25 in response to the condition affecting the bulb 2. This then can be done without interrupting or disturbing the process controlled by valve 3.

The switch or transfer of the control of valve 3 from automatic control to manual control is made by a reverse sequence of steps. If the indicator 65 does not show on the scale 66 that the automatically controlled pressure in bellows 62 is equal to the manually controlled pressure in bellows 63, the needle valve 41 should be adjusted until the automatically controlled and manually controlled pressures are equal. When these pressures are equal, transfer valve 44 may be turned by the operator from the position in which it is shown in Fig. 1 to the position shown in Fig. 2, in which position the valve 3 is under the control of the fluid pressure regulated by the manually operated valve 41.

The purpose of bleed orifice 42 is to permit the escape of fluid from the bellows chamber 52 through the pipe 51, the outlet port 50, passageway 46, and the by-pass conduit 40 while the device is still under manual control but after the needle 41 has been wholly or partially closed or moved towards closed position. If the bleed orifice 42 were not provided, fluid would be trapped, at the highest pressure to pass through the needle valve 41, in the closed system formed by the bellows chamber 52, pipe 51, outlet port 50, passageway 46, and by-pass conduit 40. Since this fluid could not escape from this enclosed system it would be impossible to reduce or regulate downwards by adjustment of needle valve 41 the fluid pressure applied to the bellows chamber 52 and consequently the pressure applied to fluid pressure operated motor 35, which is under the control of bellows 53.

Figs. 3 and 7 show another modification of this invention having a different form of transfer valve. In this modification in which the same reference numerals are used as on corresponding parts of the arrangement of Fig. 1, the inlet pipe 31 has in it a pressure regulator 67 and a pressure gauge 68. Inlet pipe 31 communicates, at its opposite end, with a relay valve R. This relay valve has a filter 30 and a restrictive orifice 29 governing a passage communicating with the pipe 28 which terminates in the nozzle 27. The output of air from the nozzle 27 is governed by a flapper valve 25 biased by a spring 26 towards engagement with the end of the nozzle 27. Lever 22 carries pin 24 which engages the flapper valve 25 so as to move the flapper valve toward and away from the end of nozzle 27 against the stress of spring 26. The link 21 is pivotally connected to one end of lever 22. Link 22 is moved in response to that variable to which it is desired to have the controlled device respond. This may be accomplished by the mechanism shown in Fig. 1 for operating the link 21.

The inlet pipe 31 also communicates with a by-pass pipe 40A containing a manually operable pressure regulator 41A and, if desired, a pressure gauge 69. Pipe 40A communicates at its opposite end with a transfer valve, generally indicated at 70. Transfer valve 70 has five ports 71, 72, 73, 74, and 75 passing through its outer body. By means of a manually operable handle 76 the movable plug 77 which is mounted in the valve body or casing 78 can be rotated for selectively adjusting the air operated control apparatus into three different conditions of operations.

Pipe 51 connects the outlet chamber of the relay valve R with the port 72 of the transfer valve 70. Pipe 34A likewise connects at one end to the outlet chamber for the main supply of air controlled by the relay valve R and connects at its other end, to the port 73 of the transfer valve 70. The pipe 36 connects the port 71 of the transfer valve 70 with the follow up element 38, which is connected to the reset or compensating element 39.

Pipe 59A leads from pipe 34A to the interior of bellows 62. Pipe 60A leads from pipe 40A to the interior of bellows 63. Bellows 62 and 63 are separate and are enclosed within a casing 61 and carry on them an indicator 64 having a pointer 65 which indicates by reference to a stationary scale 66.

Pipe 34B leads from outlet port 74 of transfer valve 70 to a fluid motor 35 which operates valve 3 which directly changes the flow of the fuel or other substance flowing through the pipe in which valve 3 is located.

Figs. 4, 5 and 6 are transverse cross sections through the transfer valve 70. These figures are broken away on another and more remote plane adjacent the port 74 in order to disclose the construction. Transfer valve 70 has a conduit or passage 84 in the movable valve plug 77. Valve plug 77 also has in it a conduit or passage 85 extending in the shape of an arch or a portion of a ring over a part of the surface of the valve plug 77. A conduit or passage 86 extends along the surface of the valve plug 77 lengthwise or axial thereof. Conduit or passage 86 communicates at one end with conduit or passage 85 and at its rear or opposite end communicates with a conduit or passage 87 which extends in a complete ring or circle between the valve body 77 and the valve case 78. Conduit or passage 87 is thus always in communication with the outlet port 74. Outlet port 74 passes through the valve casing 78 in a plane behind or to the rear of the plane in which the ports 71, 72, 73 and 75 are located.

Fig. 4 shows the transfer switch 70 in such a position that the fluid motor 35 and consequently the control valve 3 are automatically operated under the control of the relay valve R as influenced by the operation of the flapper valve 25. The inlet air from inlet pipe 31 and by-pass pipe 40A is cut off by the transfer valve 70 at the port 75. The automatically controlled air flows through the inlet pipe 31, the pressure gauge 68, the relay valve R, pipe 34A, inlet port 73, conduits 85, 86 and 87, and out the outlet port 74 to the pipe 34B and the fluid motor 35.

Fig. 5 shows the transfer valve 70 in the position in which the inlet air flows through the inlet pipe 31, by-pass pipe 40A, the manually operated pressure regulator 41A, by-pass pipe 40A, the inlet orifice 75, the conduits 85, 86 and 87, the outlet port 74, the pipe 34B and to the fluid motor 35. Also a portion of this air flows from the conduit 85 through the port 71 and the pipe 36, to the follow up element 38.

Transfer valve 70 also provides a check position in which the automatic controller operates normally and may be serviced. The follow up element 38 and the reset or compensating element 39 may be removed if the valve 37 in pipe 36 is closed. In check position the connections of the ports of the transfer valve 70 are as follows: inlet air flows through inlet pipe 31, by-pass 40A, inlet port 75, conduits 85, 86 and 87, out through outlet port 74 and pipe 34B to fluid motor 35. At the same time the air pressure in the output chamber of the relay valve R is transmitted through pipe 51, inlet port 72, conduit 84, outlet port 71 and pipe 36, to the follow up element 38.

While in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is:

1. An air operated control system including, an inlet adapted for connection to a supply of air which furnishes the motive power of the system, a first conduit communicating with said inlet and having a restriction of fixed size therein, a first outlet orifice forming a bleed to atmosphere for a portion of the air flowing past the restriction in said conduit, an automatically operating valve adapted to vary the opening of said first outlet orifice to atmosphere in response to a variable selected to govern the operations of the system, a second conduit communicating with said inlet and forming a by-pass or parallel to said first conduit, a manually operable valve adapted to control the flow of air through said second conduit, a second outlet orifice forming a bleed to atmosphere for a portion of the air flowing through said manually operable valve, a pressure operated relay valve having a body provided with a passage through it connected at one end to said inlet, a movable valve member in said body controlling the flow of air through said passage, a pressure operated element connected to said movable valve member so as to move it in response to changes in the pressure applied thereto, a transfer valve operable to selectively connect one of said conduits to said pressure operated element and to disconnect the other of said conduits from said pressure operated element so as to expose said pressure operated element to the instantaneous pressure existing in that conduit to which it is connected and thereby to operate said pressure operated element either automatically or manually, and a control valve having an operating element communicating with an outlet from said passage through said pressure operated relay valve body so as to be operated by the pressure in said passage through said pressure operated relay valve body.

2. An air operated control system including, an inlet adapted for connection to a supply of air which furnishes the motive power of the system, a first conduit communicating with said inlet and having a restriction of fixed size therein, a first outlet orifice forming a bleed to atmosphere for a portion of the air flowing past the restriction in said conduit, an automatically operating valve varying the opening of said first outlet orifice to atmosphere in response to a variable selected to govern the operations of the system, a second conduit communicating with said inlet and forming a by-pass or parallel to said first conduit, a manually operable valve controlling the flow of air through said second conduit, a second outlet orifice forming a bleed to atmosphere for a portion of the air flowing through said manually operable valve, a pressure operated relay valve having a body provided with a passage through it connected at one end to said inlet, a movable valve member in said body controlling the flow of air through said passage, a pressure operated element connected to said movable valve member so as to move it, a transfer valve operable to selectively connect one of said conduits to said pressure operated element and to disconnect the other of said conduits from said pressure operated element so as to expose said pressure operated element to the instantaneous pressure existing in that conduit to which it is connected and thereby to operate said pressure operated element either automatically or manually, a control valve having an operating element communicating with an outlet from said passage through said pressure operated relay valve body so as to be operated by the pressure in said passage through said pressure operated relay valve body, and an air pressure operated indicator having a hollow body and a movable indicating element and separate expansible pressure chambers on opposite sides of said indicating element, a connection between said first conduit and said hollow body on one side of said indicating element, and a connection between said second conduit and said hollow body on the other side of said indicating element, whereby said indicating element is movable in response to any difference between the pressure in said conduits so as to indicate whether or not there is a predetermined ratio between the pressures.

3. An air-operated control system including, an inlet adapted for connection to a supply of air which furnishes the motive power of the system, an automatically operating control instrument communicating with said inlet and responsive to a variable selected to govern the operations of the system, a pressure-operated element forming the operating element of said automatic instrument, a manually operable control instrument communicating with said inlet, a restrictive orifice connected to the opposite side of said manual instrument from said inlet and affording a bleed to atmosphere for a portion of the flow of air controlled by said manual instrument, a transfer valve having a plurality of separate inlet connections thereto and an outlet therefrom and operable to selectively connect one of said instruments to said pressure-operated element and to disconnect the other of said instruments from said pressure-operated element, a control valve controlled by said pressure-operated element in response to the movements of said pressure-operated element either under the control of said automatic instrument or of said manual instrument, an air-pressure-operated indicator having an indicating element movable in response to the difference between two air pressures each applied to a separate expansible pressure chamber, said chambers being on opposite sides of said indicating element, a connection to one side of said indicating element from between said inlet and one inlet connection to said transfer valve, and a connection to the other side of said indicating element from between said manual instrument and another inlet connection to said transfer valve.

4. In a fluid-operated control system having a fluid-operated final control element, the combination including, a fluid-pressure-operated relay controlling the operation of the final control element, a fluid-pressure-operated control instrument operative to set up a first fluid pressure variable in accordance with a condition, a manually-operated pressure regulator operable to set up a second fluid pressure, a transfer valve operable to connect said first fluid pressure to said relay and to disconnect said second fluid pressure from said relay and vice versa, and a fluid-pressure-operated gauge connected to said first and second fluid pressures to indicate whether or not said pressures are at a selected ratio to each other.

5. In an air-operated control system having an air-operated final control element, the combination including, an air-operated pilot relay controlling the operation of the final control element, an air-operated controller operative to set up a first air pressure variable in accordance with the value of a condition, a manually operated pressure regulator to set up a second air pressure, selector means operable to connect said first air pressure to said pilot relay and to disconnect said second air pressure from said pilot relay and vice versa, and a differential-air-pressure-operated gauge connected to said first and second air pressures and having a movable indicator responsive to said first and second air pressures to indicate when said pressures are balanced.

JOSEPH G. HORN.

References Cited in the file of this patent

UNITED STATES PATENTS

| Number | Name | Date |
|---|---|---|
| 1,920,827 | Wunsch | Aug. 1, 1933 |
| 2,202,286 | Gorrie | May 28, 1940 |
| 2,268,469 | Barnhart | Dec. 30, 1941 |
| 2,311,853 | Moore | Feb. 23, 1943 |
| 2,369,887 | Eckman | Feb. 20, 1945 |
| 2,423,394 | Lee | July 1, 1947 |
| 2,476,104 | Mason | July 12, 1949 |

FOREIGN PATENTS

| Number | Country | Date |
|---|---|---|
| 458,823 | Great Britain | Dec. 28, 1936 |